US012604385B2

(12) United States Patent
Liu

(10) Patent No.: US 12,604,385 B2
(45) Date of Patent: Apr. 14, 2026

(54) HIGH-EFFICIENCY, ENERGY-SAVING, SAFE DUAL-COLOR LED CONTROL CIRCUIT

(71) Applicant: Hang Liu, Jingzhou (CN)

(72) Inventor: Hang Liu, Jingzhou (CN)

( * ) Notice: Subject to any disclaimer, the term of this patent is extended or adjusted under 35 U.S.C. 154(b) by 89 days.

(21) Appl. No.: 18/660,287

(22) Filed: May 10, 2024

(65) Prior Publication Data

US 2025/0331083 A1 Oct. 23, 2025

(30) Foreign Application Priority Data

Apr. 19, 2024 (CN) ......................... 202420834128.7

(51) Int. Cl.
*H05B 47/155* (2020.01)
*H05B 45/52* (2020.01)
*H05B 47/195* (2020.01)
*H05B 47/25* (2020.01)

(52) U.S. Cl.
CPC ........... *H05B 47/155* (2020.01); *H05B 45/52* (2020.01); *H05B 47/195* (2020.01); *H05B 47/25* (2020.01)

(58) Field of Classification Search
None
See application file for complete search history.

(56) References Cited

U.S. PATENT DOCUMENTS 4,739,224 A * 4/1988 Geerlings ................ B60Q 3/80 315/83
12,383,758 B2 * 8/2025 Wingren ................ H05B 47/11
2010/0231135 A1 * 9/2010 Hum ...................... H05B 45/48 315/250
2014/0333219 A1 * 11/2014 Zijlstra .................. H05B 45/39 315/192
2024/0090100 A1 * 3/2024 Kanemitsu ........... H05B 45/345
2024/0414831 A1 * 12/2024 Lu .......................... H05B 47/17
2025/0135988 A1 * 5/2025 Shimotani ................ B60Q 1/04

FOREIGN PATENT DOCUMENTS

CN 103096600 A 5/2013

* cited by examiner

*Primary Examiner* — Kenneth B Wells

(74) *Attorney, Agent, or Firm* — Bayramoglu Law Offices LLC

(57) ABSTRACT

A high-efficiency, energy-saving, safe dual-color LED control circuit includes a power supply, a controller, and several parallel LEDs. The controller internally features a program control circuit, memory circuit, infrared remote control receiving circuit, low-power power supply circuit, H-bridge drive circuit, and short-circuit protection circuit. The design of the low-power power supply circuit employs diodes D1 and D2 to prevent reverse connections and uses a zener diode ZD for clamp protection. After filtering through capacitor C1 and low-power buck voltage regulation by chip U1, it provides a stable 5V power supply with a standby power consumption less than 0.5 W, meeting Level VI energy efficiency, thus reducing the cost of using LEDs. Through the design of the short-circuit protection circuit, when a short circuit or overcurrent occurs in the output line, it can promptly shut off the output to avoid accidental damage, thereby enhancing the lifespan of the LEDs.

6 Claims, 5 Drawing Sheets

Low-Power Power Supply Circuit

Wireless Remote Control Receiving Circuit

HIGH-EFFICIENCY, ENERGY-SAVING, SAFE DUAL-COLOR LED CONTROL CIRCUIT

CROSS REFERENCE TO THE RELATED APPLICATIONS

This application is based upon and claims priority to Chinese Patent Application No. 202420834128.7, filed on Apr. 19, 2024, the entire contents of which are incorporated herein by reference.

TECHNICAL FIELD

This invention relates to the field of circuit controller technology, particularly to circuit controllers for light-emitting diode (LED) lights, specifically a high-efficiency, energy-saving, safe dual-color LED control circuit.

BACKGROUND

LED circuit controllers, also known as LED controllers, is an electronic device used to control the brightness, color, and display effects of LEDs (Light Emitting Diodes). It controls the switches at various positions in the LED light circuit through chip processing, and controls the drive circuit according to a preset program, so that the LED array emits light regularly to display text or graphics.

The current LED lights used for Christmas or Halloween have high standby energy consumption and do not meet Level VI energy efficiency, which increases the cost of using LED lights. Moreover, the Christmas LED light controllers on the market lack short-circuit protection. When the output line is short-circuited or overcurrent may cause accidental burnout.

After searching, the patent with application No. CN201310029237.8 disclosed a sound and light control circuit that includes a power supply, a sound and light controller, several LED lights, and a switch control panel. The power supply is electrically connected to the sound and light controller, whose output circuit is connected to the LED lights. The casing of the sound and light controller is equipped with a switch control panel, which has a surface-mounted photo-diode and a sound-controlled microphone, both electrically connected to the sound and light controller. This invention transmits external environmental sound waves and light intensity information to the sound and light controller via the photo-diode and sound-controlled microphone, allowing the LEDs to light up, flash, and extinguish without the need for manual operation. It is structurally simple and can be used in circuits for street lights, stair lights, flashing lights, etc.

The aforementioned solutions have issues with not meeting Level VI energy efficiency and lacking short-circuit protection, which can lead to reduced lifespan and increased usage costs of LED lights. Therefore, there is a need for a high-efficiency, energy-saving, safe dual-color LED control circuit.

SUMMARY

The objective of this invention is to provide a high-efficiency, energy-saving, safe dual-color LED control circuit. This circuit features a low-power power supply design that utilizes diodes D1 and D2 to prevent reverse connections, and a zener diode ZD for clamp protection. It includes a capacitor C1 for filtering, and the chip U1 for low-power buck voltage regulation, providing a stable 5V supply. The standby power consumption is less than 0.5 W, meeting Level VI energy efficiency standards and reducing the operational costs of LEDs. The design also incorporates a short-circuit protection circuit, which promptly shuts off output in the event of a short circuit or overcurrent, preventing accidental damage and thereby extending the life of the LED lamps. This invention addresses the issues raised in the aforementioned background technology.

To achieve these objectives, the invention provides the following technical solutions: A high-efficiency, energy-saving, safe dual-color LED control circuit, which includes a power supply, a controller, and multiple parallel LED lamps. The power supply is electrically connected to the controller, whose output end is connected to the LED lamps.

The controller is equipped with buttons on its casing; internally, it includes a program control circuit, memory circuit, infrared remote control receiving circuit, low-power power supply circuit, H-bridge drive circuit, and short-circuit protection circuit. The program control circuit, memory circuit, and H-bridge drive circuit are all electrically connected to the low-power power supply circuit, and the memory circuit, infrared remote control receiving circuit, H-bridge drive circuit, and short-circuit protection circuit are all electrically connected to the program control circuit.

Preferably, the program control circuit includes a chip U2. Between pins 1 and 14 of chip U2, a capacitor C4 is connected, and pin 1 of chip U2 is connected to a 5V voltage. Between pins 1 and 4 of chip U2, a resistor R3 and an LED are connected. Pin 2 of chip U2 is connected to a crystal oscillator X1, with capacitors C7 and C8 connected in series at both ends of the crystal oscillator X1. Pin 3 of chip U2 is connected to a resistor R15, which is connected between capacitor C8 and the wiring terminal of crystal oscillator X1. Pin 7 of chip U2 is connected to a ground switch SW.

Preferably, the memory circuit includes a chip U3, and the infrared remote control receiving circuit includes an infrared chip IR. Both pin 4 of chip U3 and pin 3 of the infrared chip IR are connected to 5V. Pin 3 of chip U3 is connected to pin 8 of chip U2, and pin 1 of chip U3 is connected to pin 9 of chip U2. A capacitor C5 is connected between pins 2 and 3 of the infrared chip IR, and pin 1 of the infrared chip IR is connected to pin 11 of chip U2.

Preferably, the low-power power supply circuit includes a chip U1, with a parallel arrangement of capacitor C1 and diode D1 connected between pins 1 and 2 of chip U1. Between the diode D1 and capacitor C1, a diode D2, a resistor R1, and a zener diode ZD are connected in series, and the wiring ends of diode D1 and diode D2 are connected to a power supply VCC. A capacitor C2 is connected between pins 2 and 3 of chip U1, and pin 3 of chip U1 outputs a 5V voltage.

Preferably, the H-bridge drive circuit includes metal oxide semiconductor (MOS) transistors Q1, Q2, Q3, and Q4. The multiple parallel LED lamps are connected between the drain D of MOS transistor Q1 and the source S of MOS transistor Q2, and between the drain D of MOS transistor Q3 and the source S of MOS transistor Q4.

A resistor R10 is connected between the gate G and source S of MOS transistor Q1, and a resistor R12 is connected between the gate G and source S of MOS transistor Q3, with the source S of MOS transistor Q1 and the source S of MOS transistor Q3 both connected to the power supply VCC.

Preferably, a resistor R11 is connected between the drain D of MOS transistor Q1 and the source S of MOS transistor Q2, and the gate G of MOS transistor Q3. Additionally, a resistor R9 is connected between the drain D of MOS transistor Q3 and the source S of MOS transistor Q4, and the gate G of MOS transistor Q1.

The gate G of MOS transistor Q2 is connected to a ground resistor R6 and another resistor R5, which is connected to pin 5 of chip U2. Similarly, the gate G of MOS transistor Q4 is connected to a ground resistor R8 and another resistor R7, which is connected to pin 6 of chip U2.

Preferably, the short-circuit protection circuit includes a resistor R2 connected between the drain D of MOS transistor Q2 and the drain D of MOS transistor Q4, with one end of resistor R2 connected to pin 10 of chip U2. In addition, between the drain D of MOS transistor Q2 and the drain D of MOS transistor Q4, there are parallel-connected detection resistors R13 and R14.

Compared to current technology, the beneficial effects of this invention are:

1. This invention features a low-power power supply circuit design that utilizes diode D1 and diode D2 to prevent reverse connections and zener diode ZD for clamp protection. After filtering through capacitor C1 and low-power buck voltage regulation by chip U1, it provides a stable 5V supply, with a standby power consumption less than 0.5 W, meeting Level VI energy efficiency, thereby reducing the operational costs of LEDs.
2. Through the design of the short-circuit protection circuit, the invention can promptly shut off the output when a short circuit or overcurrent occurs, avoiding accidental damage and thus extending the lifespan of the LED lamps.

DETAILED DESCRIPTION OF THE EMBODIMENTS

The following will provide a clear and complete description of the technical solutions in the embodiments of this invention, with reference to the accompanying drawings of these embodiments. It is evident that the embodiments described are only part of the embodiments of the invention, rather than all. Based on the embodiments of this invention, all other embodiments obtained by those skilled in the art without creative efforts are within the scope of protection of this invention.

Figure 1:
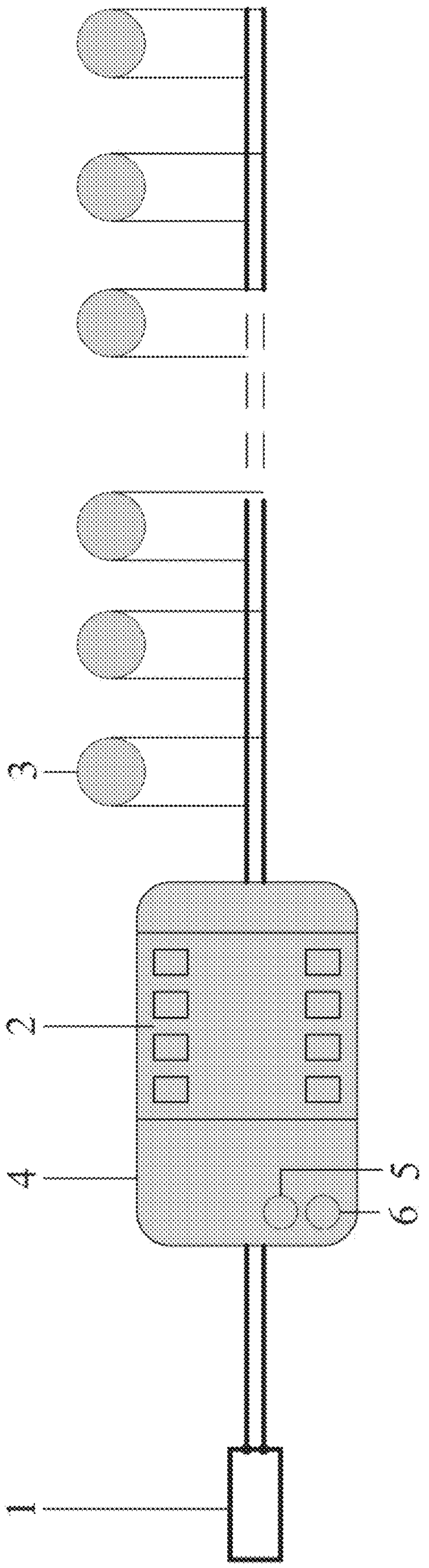
FIG. 1 is a schematic diagram of the structure of the invention.
Figure 2:
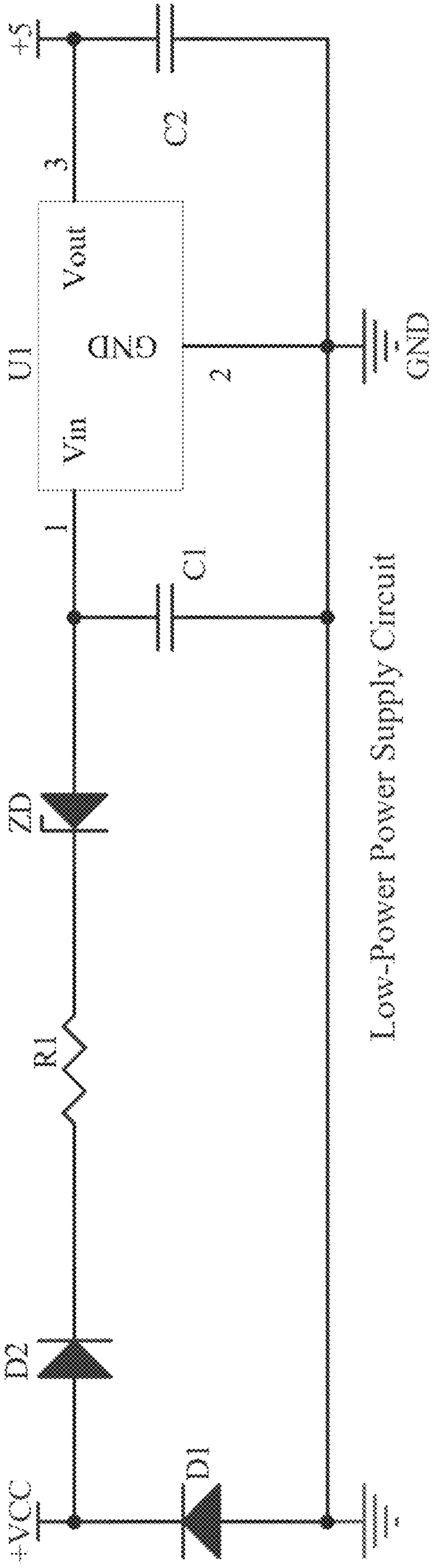
FIG. 2 is a circuit diagram of the low-power power supply circuit of the invention.
Figure 3:
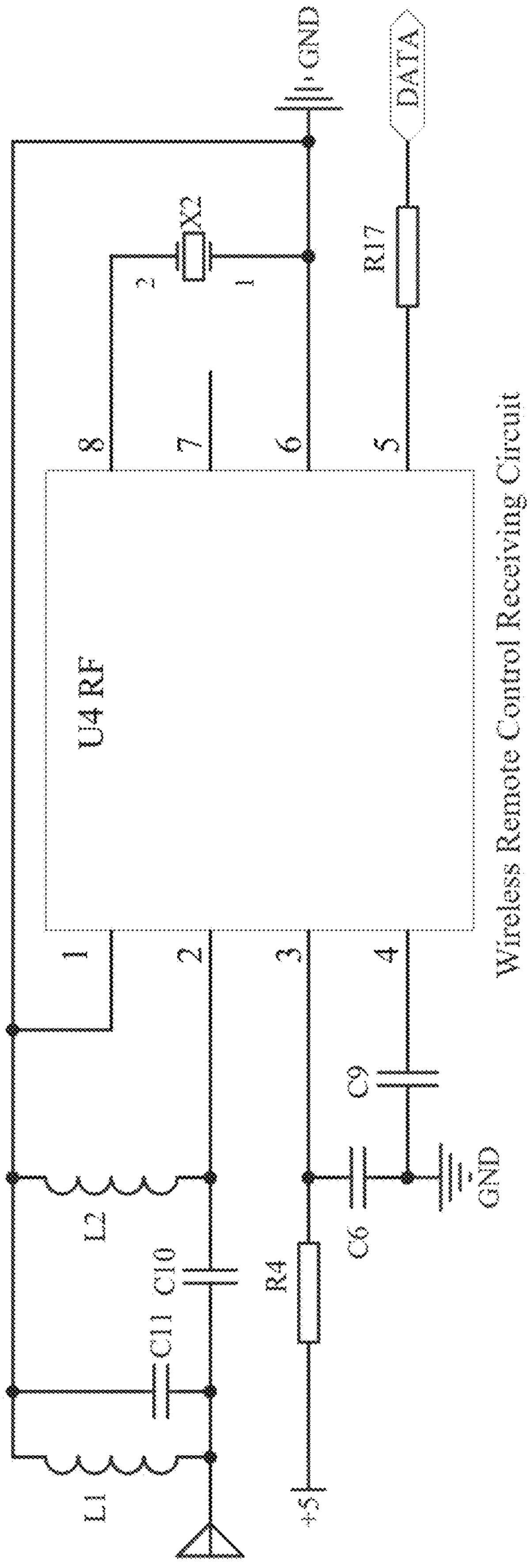
FIG. 3 is a circuit diagram of the wireless remote control receiving circuit of the invention.
Figure 4:
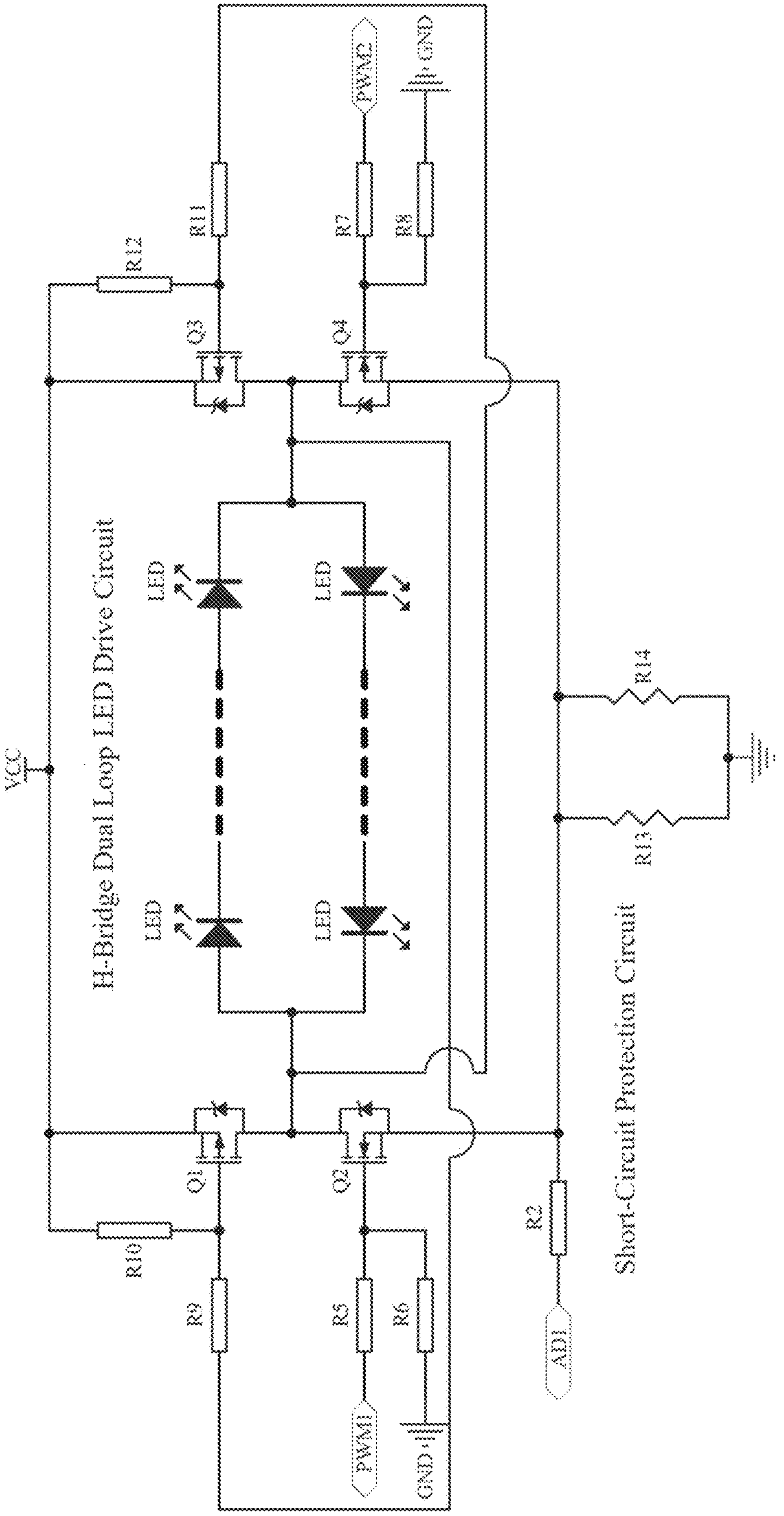
FIG. 4 is a circuit diagram of the H-bridge drive circuit and short-circuit protection circuit of the invention.
Figure 5:
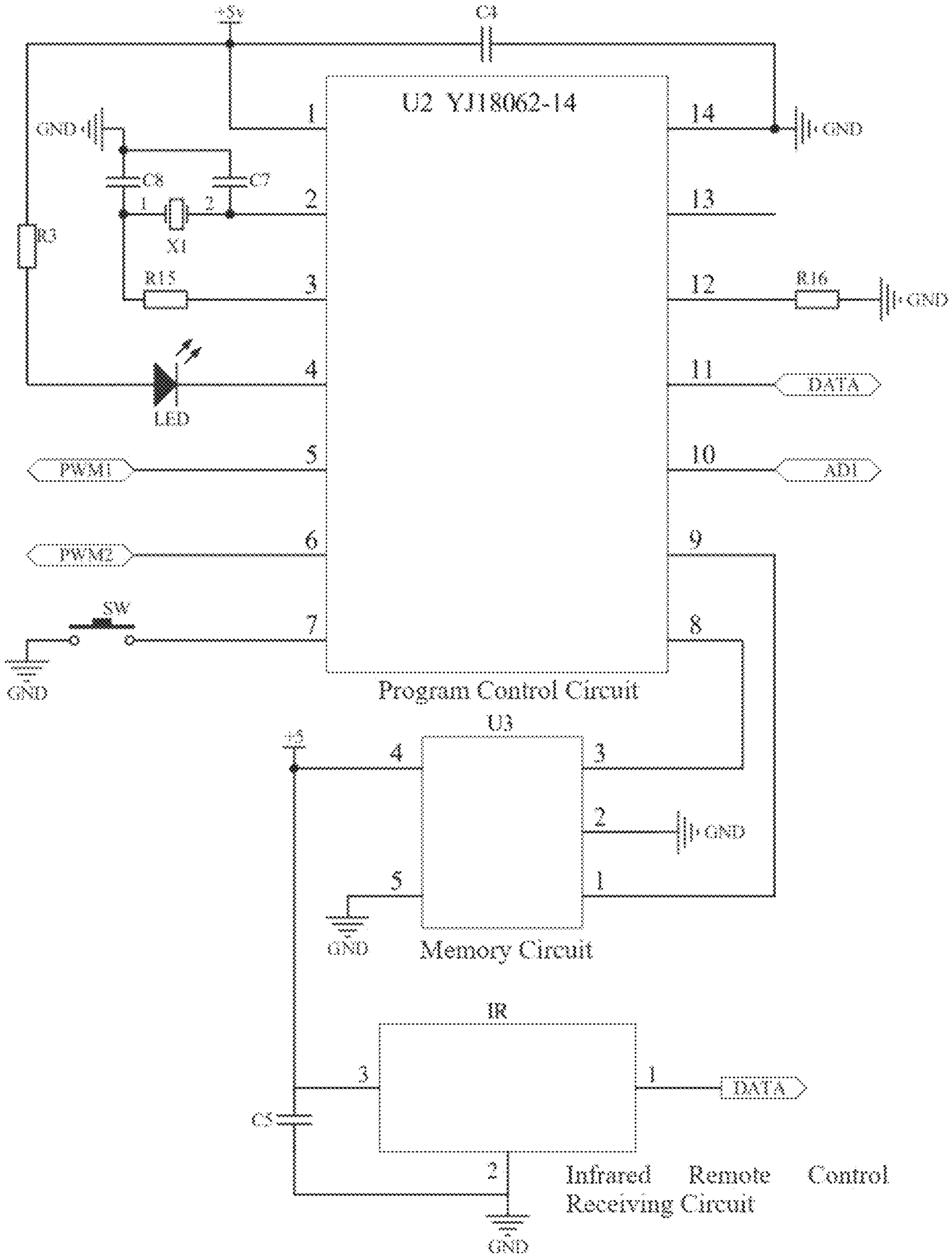
FIG. 5 is a circuit diagram of the program control circuit, memory circuit, and infrared remote control receiving circuit of the invention.

Referring to FIGS. 1-5, the invention provides a technical solution: A high-efficiency, energy-saving, safe dual-color LED control circuit, including a power supply 1, a controller 2, and multiple parallel LED lamps 3. The power supply 1 is electrically connected to the controller 2, whose output end is connected to the LED lamps 3. The controller 2 is equipped with buttons on its casing; It also has a switch control panel 4, on the surface of which are a photo-diode 5 and a sound control microphone 6, both electrically connected to the controller 2.

The LED lamps 3, connected in parallel in the circuit, can simultaneously light up, extinguish, or flash with a breathing effect, enhancing both illumination and aesthetic effects.

The LED lamps 3 use dual-color LEDs, which change colors via a circuit inversion triggered by the photo-diode 5, producing different colors of light in the dual-color LED lamps 3.

Controller 2 is equipped with various internal circuits including a program control circuit, memory circuit, infrared remote control receiving circuit, low-power power supply circuit, H-bridge drive circuit, and short-circuit protection circuit. All these circuits are electrically connected to the low-power power supply circuit, and the memory circuit, infrared remote control receiving circuit, H-bridge drive circuit, and short-circuit protection circuit are also electrically connected to the program control circuit.

The program control circuit consists of chip U2, where a capacitor C4 is connected between pins 1 and 14, and pin 1 of chip U2 is connected to a 5V voltage. Between pins 1 and 4 of chip U2, there is a connection comprising a resistor R3 and an LED. Pin 2 of chip U2 is connected to a crystal oscillator X1, with capacitors C7 and C8 connected in series across the ends of the crystal oscillator X1. A resistor R15 is connected to pin 3 of chip U2, which is connected between capacitor C8 and the wiring end of the crystal oscillator X1. A ground switch SW is connected to pin 7 of chip U2, enabling selection of functions via the switch SW.

Chip U2 can be either model YJ18062-14 or YJ17062-8 and is capable of recording multiple different settings.

The memory circuit can store the selected modes and includes chip U3. The infrared remote control receiving circuit includes an infrared chip IR. Both pin 4 of chip U3 and pin 3 of the infrared chip IR are connected to 5V voltage. Pin 3 of chip U3 is connected to pin 8 of chip U2, and pin 1 of chip U3 is connected to pin 9 of chip U2. Pins 2 and 5 of chip U3 are both grounded. A capacitor C5 is connected between pins 2 and 3 of the infrared chip IR, and pin 1 of the infrared chip IR is connected to pin 11 of chip U2.

The circuit also includes a wireless remote control receiving circuit, which comprises chip U4. Between pins 1 and 2 of chip U4, there are inductors L1 and L2 and a capacitor C11 connected in parallel. A capacitor C10 is connected between capacitor C11 and inductor L2. Pin 3 of chip U4 is connected to a resistor R4 which is connected to a 5V voltage, and a grounded capacitor C6 and capacitor C9 are connected between pins 3 and 4 of chip U4.

Pin 1 of chip U4 is connected to pin 6, and between pins 6 and 8, a crystal oscillator X2 is connected. Pin 5 of chip U4 is connected to a resistor R17, which is connected to pin 11 of chip U2.

The low-power power supply Circuit includes chip U1, with a parallel arrangement of capacitor C1 and diode D1 connected between pins 1 and 2. Between diode D1 and capacitor C1, a diode D2, a resistor R1, and a zener diode ZD are connected in series, and the wiring ends of diode D1 and diode D2 are connected to a power supply VCC. A capacitor C2 is connected between pins 2 and 3 of chip U1, and pin 3 of chip U1 outputs a 5V voltage.

The cathode of diode D1 is connected to the anode of diode D2, and the two terminals of resistor R1 are connected respectively to the cathode of diode D2 and the anode of the zener diode ZD. Diodes D1 and D2 provide reverse connection protection, while the zener diode ZD provides clamp protection. After filtering through capacitor C1 and the low-power buck voltage regulation by chip U1, a stable 5V power supply is provided to power chips U2, U3, and U4.

H-bridge drive circuit includes MOS transistors Q1, Q2, Q3, Q4, and multiple parallel LED lamps 3 connected between the drain D of MOS transistor Q1 and the source S of MOS transistor Q2, and between the drain D of MOS transistor Q3 and the source S of MOS transistor Q4.

In the circuit described, a resistor R10 is connected between the gate G and source S of MOS transistor Q1, and a resistor R12 is connected between the gate G and source S of MOS transistor Q3. Additionally, the source S of MOS transistor Q1 and the source S of MOS transistor Q3 are both connected to the power supply VCC.

A resistor R11 is connected between the drain D of MOS transistor Q1 and the source S of MOS transistor Q2, and the gate G of MOS transistor Q3. Additionally, a resistor R9 is connected between the drain D of MOS transistor Q3 and the source S of MOS transistor Q4, and the gate G of MOS transistor Q1.

On the gate G of MOS transistor Q2, there are two resistors: a grounded resistor R6 and another resistor R5 connected to pin 5 of chip U2. Similarly, on the gate G of MOS transistor Q4, there are a grounded resistor R8 and another resistor R7 connected to pin 6 of chip U2.

The H-bridge drive circuit mainly consists of four MOS transistors, which provide efficient driving capabilities for LEDs. Unlike traditional designs that typically use six triodes, this H-bridge configuration not only saves costs but also enhances the driving efficiency of the LED lamps.

The short-circuit protection circuit includes a resistor R2 connected between the drain D of MOS transistor Q2 and the drain D of MOS transistor Q4, with one end of resistor R2 connected to pin 10 of chip U2. Additionally, between the drain D of MOS transistor Q2 and the drain D of MOS transistor Q4, there are parallel-connected detection resistors R13 and R14.

Although the embodiments of this invention have been illustrated and described, it should be understood by those skilled in the art that various changes, modifications, substitutions, and alterations can be made to these embodiments without departing from the principles and spirit of the invention. The scope of this invention is defined by the appended claims and their equivalents.

What is claimed is:

1. A high-efficiency, energy-saving, safe dual-color light-emitting diode (LED) control circuit, comprising a power supply VCC, a controller, and a plurality of parallel LED lamps; the power supply is electrically connected to the controller, and an output of the controller is electrically connected to the plurality of parallel LED lamps; a casing of the controller is provided with buttons; the controller comprises a program control circuit, a memory circuit, an infrared remote control receiving circuit, a power supply circuit, an H-bridge drive circuit, and a short-circuit protection circuit; wherein the program control circuit, the memory circuit, and the H-bridge drive circuit are electrically connected to the power supply circuit, while the memory circuit, the infrared remote control receiving circuit, the H-bridge drive circuit, and the short-circuit protection circuit are electrically connected to the program control circuit; wherein the power supply circuit comprises a chip U1; between a pin 1 and a pin 2 of the chip U1, a capacitor C1 and a diode D1 are connected in parallel; in series between the diode D1 and the capacitor C1, there is a diode D2, a resistor R1, and a voltage-stabilizing diode ZD; a wiring end of the diode D1 and a wiring end of the diode D2 are connected to the power supply VCC; a capacitor C2 is connected between a pin 2 and a pin 3 of the chip U1, and a pin 3 of the chip U1 outputs a 5V voltage.

2. The high-efficiency, energy-saving, safe dual-color LED control circuit according to claim 1, wherein the program control circuit comprises a chip U2; a capacitor C4 is connected between a pin 1 and a pin 14 of the chip U2, and the pin 1 of the chip U2 is connected to a 5V voltage; a resistor R3 and an LED of the program control circuit are connected between the pin 1 and a pin 4 of the chip U2; a pin 2 of the chip U2 is connected to a crystal oscillator X1, having first and second ends, and a capacitor C7 and a capacitor C8 are connected in series across the first and second ends of the crystal oscillator X1; a resistor R15 is connected to a pin 3 of the chip U2, wherein the resistor R15 is connected between the capacitor C8 and a wiring end of the crystal oscillator X1; and a ground switch SW is connected to a pin 7 of the chip U2.

3. The high-efficiency, energy-saving, safe dual-color LED control circuit according to claim 2, wherein the memory circuit comprises a chip U3, and the infrared remote control receiving circuit comprises an infrared chip IR; a pin 4 of the chip U3 and a pin 3 of the infrared chip IR are connected to the 5V voltage; a pin 3 of the chip U3 is connected to a pin 8 of the chip U2, and a pin 1 of the chip U3 is connected to a pin 9 of the chip U2; a capacitor C5 is connected between a pin 2 and a pin 3 of the infrared chip IR, and a pin 1 of the infrared chip IR is connected to a pin 11 of the chip U2.

4. The high-efficiency, energy-saving, safe dual-color LED control circuit according to claim 1, wherein the H-bridge drive circuit comprises a metal oxide semiconductor (MOS) transistor Q1, an MOS transistor Q2, an MOS transistor Q3, and an MOS transistor Q4; the plurality of parallel LED lamps are connected between a drain D of the MOS transistor Q1 and a drain D of the MOS transistor Q2, and between a drain D of the MOS transistor Q3 and a drain D of the MOS transistor Q4; and a resistor R10 is connected between a gate G and a source S of the MOS transistor Q1, and a resistor R12 is connected between a gate G and a source S of the MOS transistor Q3, wherein the source S of the MOS transistor Q1 and the source S of the MOS transistor Q3 are both connected to the power supply VCC.

5. The high-efficiency, energy-saving, safe dual-color LED control circuit according to claim 4, wherein a resistor R11 is connected between the drain D of the MOS transistor Q1 and the drain D of the MOS transistor Q2, and a gate G of the MOS transistor Q3; additionally, a resistor R9 is connected between the drain D of the MOS transistor Q3 and the drain D of the MOS transistor Q4, and a gate G of the MOS transistor Q1; and a gate G of the MOS transistor Q2 is connected to a ground resistor R6 and a resistor R5, wherein the resistor R5 is connected to a pin 5 of a chip U2; a gate G of the MOS transistor Q4 is connected to a ground resistor R8 and a resistor R7, wherein the resistor R7 is connected to a pin 6 of the chip U2.

6. The high-efficiency, energy-saving, safe dual-color LED control circuit according to claim 4, wherein the short-circuit protection circuit comprises a resistor R2 connected between a drain D of the MOS transistor Q2 and a drain D of the MOS transistor Q4; an end of the resistor R2 is connected to a pin 10 of a chip U2; and between the drain D of the MOS transistor Q2 and the drain D of the MOS transistor Q4, there are parallel-connected detection resistors R13 and R14.

* * * * *